United States Patent [19]

Early

[11] Patent Number: 5,756,924
[45] Date of Patent: May 26, 1998

[54] MULTIPLE LASER PULSE IGNITION METHOD AND APPARATUS

[75] Inventor: James W. Early, Los Alamos, N. Mex.

[73] Assignee: The Regents of the University of California, Oakland, Calif.

[21] Appl. No.: 618,434

[22] Filed: Mar. 15, 1996

Related U.S. Application Data

[60] Provisional application No. 60/005,356, Oct. 16, 1995.

[51] Int. Cl.$^6$ .............................. F02P 23/04; F42C 19/00
[52] U.S. Cl. ........................ 102/201; 123/143 B; 372/25
[58] Field of Search ................................. 102/201, 213,
102/202; 372/25; 359/349; 376/103, 104;
210/121.76, 121.61; 123/143 B, DIG. 9;
60/39.821

[56] References Cited

U.S. PATENT DOCUMENTS

| | | | |
|---|---|---|---|
| 3,902,036 | 8/1975 | Zaleckas | 219/121.83 |
| 4,416,226 | 11/1983 | Nishida et al. | 123/143 B |
| 4,870,244 | 9/1989 | Copley et al. | 219/121.7 |
| 5,038,016 | 8/1991 | Robertson et al. | 219/121.83 |
| 5,157,676 | 10/1992 | Wilcox | 372/29 |
| 5,321,715 | 6/1994 | Trost | 372/69 |
| 5,347,528 | 9/1994 | Haruta et al. | 372/25 |
| 5,400,351 | 3/1995 | Montgomery et al. | 372/34 |
| 5,533,040 | 7/1996 | Zhang | 372/25 |

OTHER PUBLICATIONS

Dale, J. D., Smy, P. R., and Clements, R. M., Laser Ignited Internal Combustion Engine—An Experimental Study, Society of Automotive Engineers, Inc., 1978.

Santavicca, D. A., Ho, C., Reilly, B. J., Lee, T. W., Laser Induced Spark Ignition of Methane–Oxygen Mixtures, Technical Report, Pennsylvania State University, 1991.

Lefebvre, Arthur H., Ignition, *Gas Turbine Combustion*, Hemisphere Publishing Corporation, New York, 1983, 221–259.

Laffitte, B. P., and Delbourgo, R., Flammability, *Fourth Symposium (International) on Combustion*, 114–121 (Massachusetts Institute of Technology, 1952).

Ballal, D. R. and Lefebvre, A. H., Ignition and Flame Quenching of Flowing Heterogeneous Fuel–Air Mixtures, *Combustion and Flame*, 35: 155–168 (1979).

Danis, Allen M., Namer, Izak, and Cernansky, Nicholas P., Droplet Size Equivalence Ratio Effects on Spark Ignition of Monodisperse N–Heptane and Methanol Sprays, *Combustion and Flame*, 74: 285–294 (1988).

Olson, W. T., Childs, J. H., and Jonash, E. R., The Combustion–Efficiency Problem of the Turbojet at High Altitude, NACA ASME 54–SA–24, 1954.

de Boer, P. C. T. and Mell, Ellen R., Laser Induced Ignition of Monodisperse Kerosene Fuel Sprays, paper, Cornell University, Ithaca, New York, undated.

Ballal, D. R. and Lefebvre, A. H., Ignition and Flame Quenching of Quiescent Fuel Mists, *Proc. Roy. Soc.* (London) A. 364, 277–294 (1978).

Kingdon, Richard G. and Weinberg, Felix J., The Effect of Plasma Constitution on Laser Ignition Energies, *Ignition, Optical and Electric Properties*, 747–755, undated.

Syage, J. A., Fournier, E. W., Rianda, R., and Cohen, R. B., Dynamics of Flame Propagation Using Laser–Induced Spark Initiation: Ignition Energy Measurements, *J. Appl. Phys.* 64(3), 1 Aug. 1988.

Ballal, D. R. and Lefebvre, A. H., Basic Ignition Research Related to Altitiude Relight Problems, *Relighting*, pp. 189–201, undated.

Ronney, Paul D., Laser Versus Conventional Ignition of Flames, paper, Princeton University, SPIE, vol. 1862 (1993).

*Primary Examiner*—Charles T. Jordan
*Assistant Examiner*—Christopher K. Montgomery
*Attorney, Agent, or Firm*—Gemma Morrison Bennett

[57] ABSTRACT

Two or more laser light pulses with certain differing temporal lengths and peak pulse powers can be employed sequentially to regulate the rate and duration of laser energy delivery to fuel mixtures, thereby improving fuel ignition performance over a wide range of fuel parameters such as fuel/oxidizer ratios, fuel droplet size, number density and velocity within a fuel aerosol, and initial fuel temperatures.

4 Claims, 13 Drawing Sheets

MULTIPLE LASER PULSE IGNITION METHOD AND APPARATUS

This invention was made with government support under Contract No. W-7405ENG-36 awarded by the U.S. Department of Energy. The government has certain rights in the invention.

TECHNICAL FIELD

This invention relates to laser ignition.

This application claims the benefit of U.S. Provisional Application No. 60/005,356, filed Oct. 16, 1995

BACKGROUND ART

The use of laser light to initiate the ignition of fuel/oxidizer mixtures has been a fuel combustion research and development subject for a number of years. Laser induced ignition of liquid fuel aerosols has been investigated as a solution to some of the problems of commercially used capacitive discharge ignitors. The state-of-the-art, laser-based ignition process employed in these studies uses a laser-spark, air-breakdown ignition method in which a single, high peak-power laser light pulse is used to initiate fuel ignition via the generation of a high temperature, ionization plasma.

Various types of short pulse length lasers operating in the range of wavelengths from ultraviolet to infrared have been employed in laser-spark, air-breakdown ignition methods. The performance of these laser-spark, air-breakdown methods of igniting fuel aerosols is unreliable except within narrow ranges of fuel parameters such as fuel/oxidizer ratios, fuel droplet size, number density and velocity within a fuel aerosol, and initial fuel and air temperatures.

Laser spark breakdown ignition of fuel/oxidizer mixtures occurs basically in four steps: (1) non-resonant multiphoton ionization of gas molecules generating a light absorbing plasma via electron cascade; (2) deposition of thermal energy and vaporization of fuel droplets; (3) initiation of combustion through both thermal and photo-chemical reaction of fuel and oxidizer; and (4) formation and propagation of the flame kernel to regions outside the initial site of plasma formation.

The plasma formation of step (1) requires the application of high power density laser light. This requirement necessitates the use of a high peak power laser source and short duration laser pulses with no more than tens of nanoseconds in pulse length. High peak laser power can cause the formation of intense shock waves within the ignited fuel which can cause self-extinguishing of the laser induced ignition flame.

Heating of the fuel droplets, and establishment and propagation of the combustion flame kernel in steps (2), (3) and (4) occur over a much longer time frame. During this period, energy must be continuously delivered to the interaction region by the laser at the rate needed to compensate for energy losses to the outside including thermal radiation and heat conduction and collisional deactivation of excited reactant molecules.

The time frames in which energy deposition must occur for each of these processes are in direct conflict with the nature of the single laser light pulse which is applied to initiate combustion. Generally, a laser light pulse which simultaneously applied to initiate combustion. Generally, a laser light pulse which simultaneously accommodates the energy needs of each of the processes is chosen. Typically, a Q-switched laser with a pulse width and pulse energy which will provide the peak power density required to initiate plasma formation is used to satisfy concurrently the need for time-averaged power for sustaining ignition.

Attempting to simultaneously address such divergent needs leads to serious inefficiencies in the energy delivery process, particularly with respect to the magnitude of pulse energy which is required. Merely satisfying the minimum energy required to initiate breakdown does not necessarily optimize the simultaneous delivery of light energy needed to sustain the ignition kernel. Such a compromise leads to border-line ignition performance, poor reliability and overkill in the size of the laser employed.

Choice of an all-purpose laser pulse to be used as a compromise to meet divergent needs results in marginal initiation of laser breakdown ignition performance. This is much like putting all one's eggs in one basket: conditions such as turbulence induced aerodynamic straining of the flame kernel, spatial variations in fuel/oxidizer composition or fuel droplet size, impurities, and shock wave formation can lead to failure of ignition.

Therefore, there is a need for a laser ignition process which can reliably ignite gaseous or aerosol fuel mixtures within a broad range of parameters such as fuel/oxidizer ratios, fuel droplet size, number density and velocity within a fuel aerosol, and initial fuel temperatures.

There is a need for an energy efficient process for initiating and sustaining the ignition of a broad range of gaseous and aerosol fuel/oxidizer mixtures.

Economical improvements in ignition technology are also needed.

It is therefore an object of this invention to provide a reliable ignition process.

It is another object of this invention to provide a process for reliable, energy efficient laser ignition of gaseous or aerosol fuel/oxidizer mixtures.

It is a further object of this invention to provide temporally tailored laser light for improved ignition of gaseous or aerosol fuel/oxidizer mixtures.

It is yet another object of this invention to provide a laser ignition process which reduces laser light peak power energy requirements and the size of the laser necessary for dependable ignition.

It is still another object of this invention to provide a laser ignition process which inhibits the formation of intense shock waves within the ignited fuel.

Another object of this invention is to provide a laser ignition process which enhances the utilization of optical transport of laser light in laser-based ignitor applications.

It is another object of this invention to provide a fuel ignition apparatus.

Additional objects, advantages and novel features of the invention will be set forth in part in the description which follows, and in part will become apparent to those skilled in the art upon examination of the following or may be learned by practice of the invention.

DISCLOSURE OF INVENTION

To achieve the foregoing and other objects, and in accordance with the purposes of the present invention, as embodied and broadly described herein, there has been invented an ignition method comprising:

(a) contacting a fuel with a short duration laser pulse to form a plasma and to initiate fuel combustion; and (b) contacting said plasma with a long duration laser pulse, thereby stabilizing and sustaining said fuel combustion.

For accomplishing the foregoing ignition method, there has been invented an ignition apparatus comprising:

(a) at least one laser light source positioned such that a laser pulse emanating therefrom would be directed through a beam splitter optic;

(b) photodetector light sensor positioned so as to be able to receive laser light from said beam splitter optic; and (c) a laser light focusing lens positioned so as to receive laser light from said beam splitter optic which is not directed toward said apertured photodetector light sensor.

BRIEF DESCRIPTION OF THE DRAWINGS

The accompanying drawings, which are incorporated in and form a part of the specification, illustrate some of the embodiments of the present invention and, together with the description, serve to explain the principles of the invention. In the drawings.

BEST MODES FOR CARRYING OUT THE INVENTION

Figure 1:
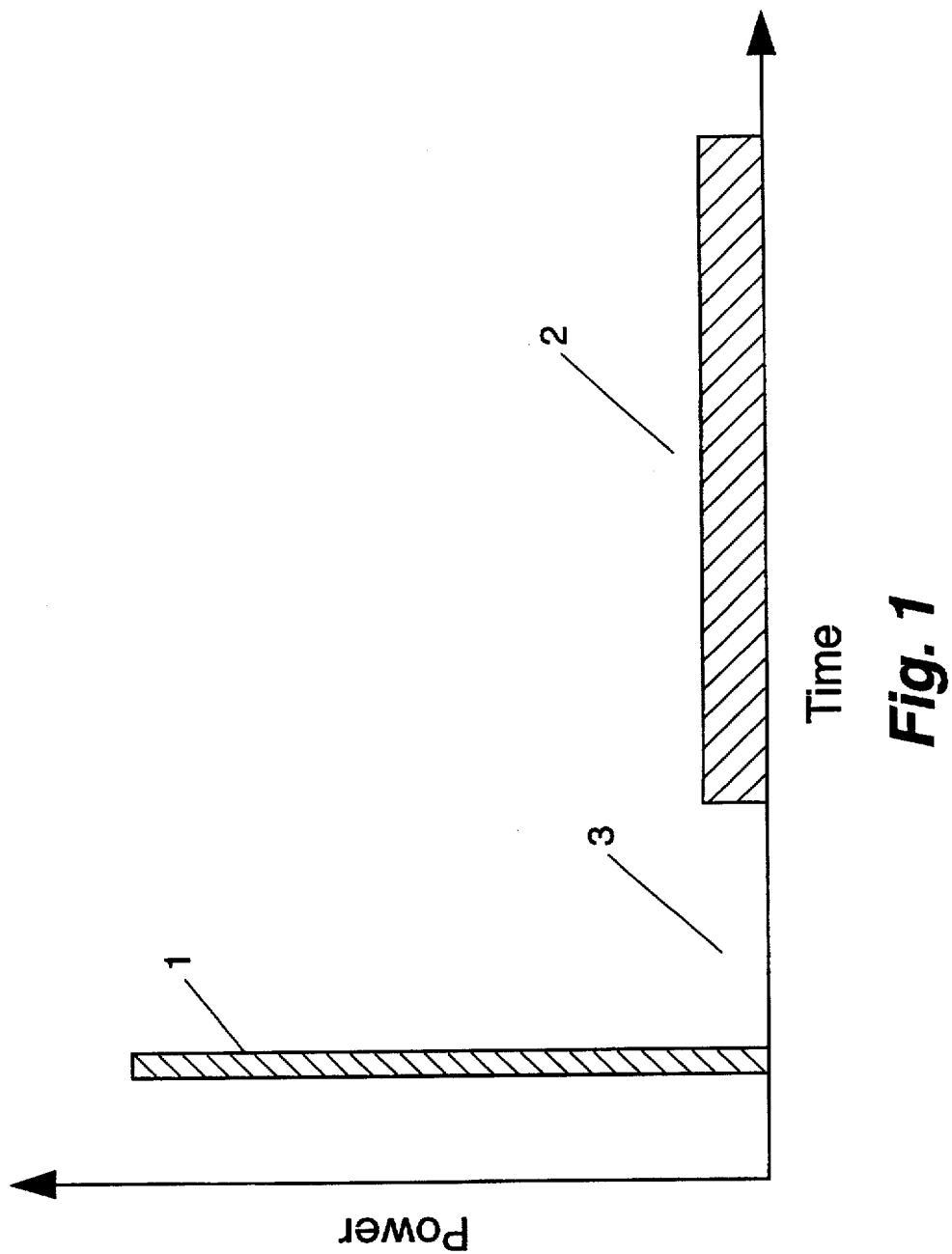
FIGS. 1, 2a, 2b, 2c, 2d, 2e and 2f are schematic representations of sequences of laser pulses in accordance with the present invention.

It has been discovered that two or more laser light pulses with certain differing temporal lengths and peak pulse powers can be employed in sequence to regulate the rate and duration of laser energy delivery to fuel mixtures, thereby improving fuel ignition performance over a wide range of fuel parameters such as fuel/oxidizer ratios, fuel droplet size, number density and velocity within a fuel aerosol, and initial fuel temperatures.

In a presently preferred embodiment of the present invention, a first laser pulse of short duration and having high peak power is applied to a fuel medium to establish a light absorptive breakdown plasma at laser pulse energy at least sufficient for laser spark formation, i.e., having the minimal pulse energy necessary to exceed the threshold energy for ionization of the fuel/oxidizer medium. Once plasma formation is initiated, seed electrons contained within the plasma then absorb subsequent laser light to further ionize fuel/oxidizer molecules in an electron cascade process. The laser induced ionization mechanism may be either resonant or non-resonant with respect to the excitation of fuel or oxidizer components.

Laser light wavelengths ranging from ultraviolet to infrared can be used for the initial short duration laser pulse. Which wavelengths are most effective depends upon the breakdown processes. Light wavelengths at which resonant excitation and ionization of fuel/oxidizer components is obtained typically utilizing short light wavelengths which are preferred due to the greater efficiency in the ionization yield. For non-resonant ionization of fuel/oxidizer components, wavelengths as short as 200 nanometers can possibly be effectively used; wavelengths as long as 12 microns can possibly be effectively used. Generally presently preferred for most common fuels are wavelengths in the infrared range from about 800 nanometers to about 12 microns.

The initial laser pulse must be of sufficient peak power to generate an ignition spark, but need be of no greater peak power. The temporal length of the laser pulse appropriate for air breakdown or generation of an ignition spark may be anywhere from femtoseconds to hundreds of nanoseconds in duration, depending upon the laser pulse. This ignition spark can be augmented by focusing of laser light within the fuel droplet.

The initial short duration laser pulse may be obtained from any high peak power output laser system. For example, the initial short duration laser pulse may be generated by a Q-switched, mode-locked or cavity dumping laser. Presently preferred are Q-switched laser systems.

Application of the initial short duration laser pulse is followed by application of a longer duration, lower peak power laser pulse. The purpose of this subsequent longer duration laser pulse is to sustain or prolong the breakdown plasma which was generated by the initial short duration laser pulse. Thusly, laser energy is coupled into the fuel medium over a long time interval, approximating the temporal length of the subsequent longer duration laser pulse. Example I demonstrates the ability to sustain a breakdown plasma using the invention. Ignition of the fuel/oxidizer mixture initiated with the application of the short pulse duration light is promoted to a self-sustaining condition during the application of the subsequent longer duration laser pulse. Additionally, ionized fuel/air species produced by the laser induced combustion of the fuel/oxidizer mixture contribute to the previously established air breakdown plasma into which laser light energy may also be deposited over the duration of the long duration laser pulse. Example III is a demonstration of this.

The temporal length of the subsequent longer duration lower peak power laser pulse is at least as large or larger than that of the initial short duration laser pulse which initiated the breakdown plasma.

The subsequent longer duration lower peak power laser pulse may be obtained from a Q-switched or a free-running laser system operating in continuous or pulsed mode.

The wavelength of laser light useful for the subsequent longer duration lower peak power laser pulse is any wavelength in the range from the ultraviolet to the infrared portion of the light spectrum. Generally, longer wavelengths up to about 12 microns of laser light are preferred due to the greater efficiency in the delivery of laser energy to the plasma generated by the initial short duration laser pulse.

Wavelengths as short as 200 nm can be used effectively for the subsequent longer duration lower peak power laser pulse; wavelengths as long as 12 microns can be used effectively for the subsequent longer duration lower peak power laser pulse.

Plasma lifetime and reliability of fuel ignition can be significantly increased by inserting an appropriate temporal delay between the temporal center of the initial short duration laser pulse and the temporal center of the subsequent long duration laser pulse. Application of the laser pulses in this manner permits a longer dwell time in which the fuel medium is actively heated, further promoting the growth and stability of the developing flame kernel. Temporal delays ranging from 0 to several milliseconds can be effectively used in enhancing fuel ignition depending upon the pulse length and pulse energy of the long duration light pulse used.

Figure 2:
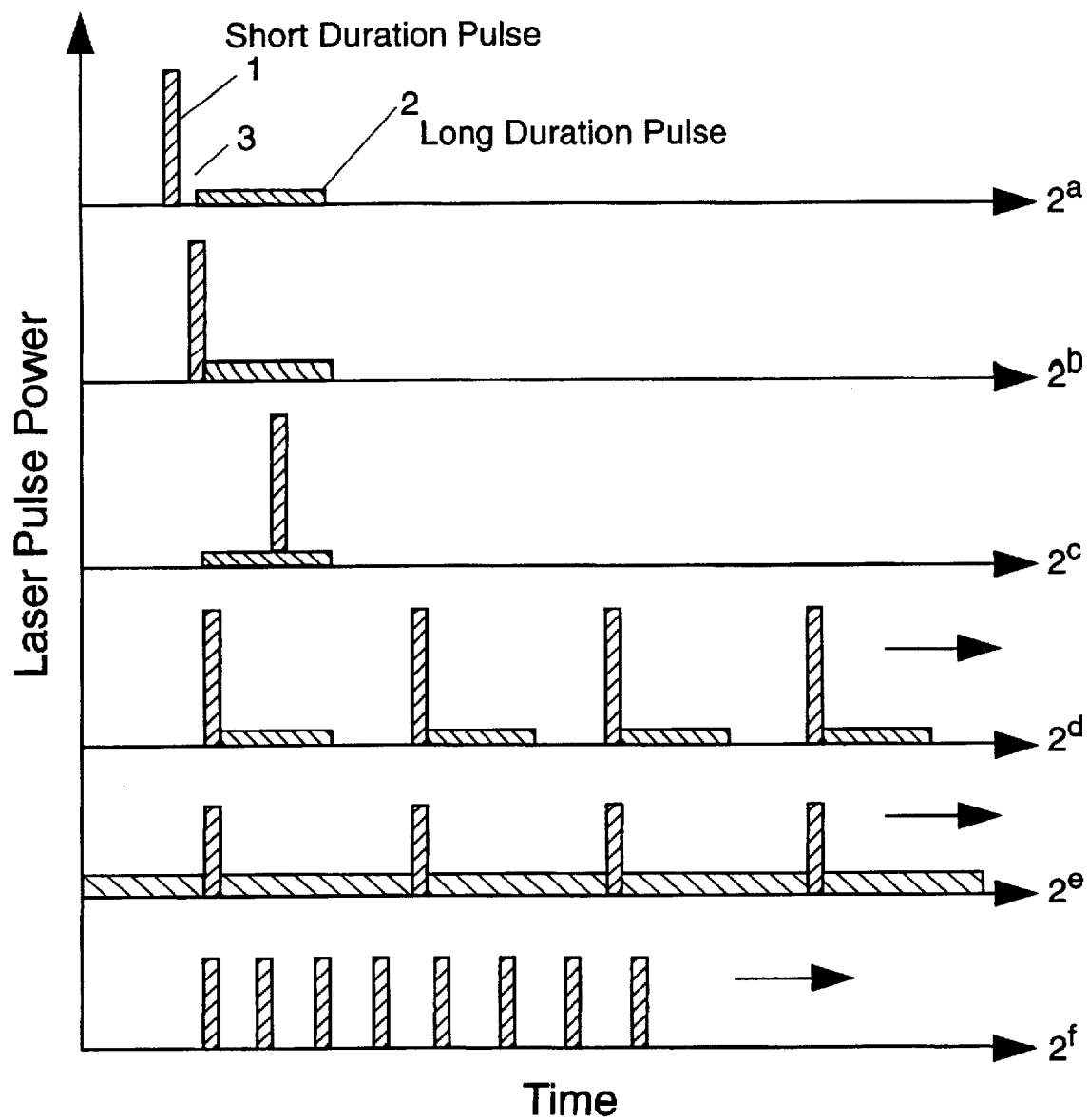

FIG. 1 is a schematic representation of a sequence of laser pulses used in the practice of a preferred embodiment of this invention. The temporal intensity profiles of the pulses shown in FIGS. 1 and 2 assume a square, flat-topped shape only for the purpose of conveniently demonstrating the phasing between the application of the laser pulses. These laser pulses more often assume a Gaussian or other temporal distribution of light intensity. With reference to FIG. 1, the power of the laser pulse is shown on the vertical or y axis and the temporal duration is shown on the horizontal or x axis. An initial short duration high peak power pulse 1 is followed by a subsequent laser pulse 2 of longer duration having significantly lower peak power after a temporal delay 3.

Although the laser pulse temporal format shown in FIG. 1 has been successfully employed, it is not the only temporal configuration which can be used to regulate the rate and duration of laser energy delivery to the combustible medium in the practice of this invention.

Schematic representations of several alternative embodiments of the method of this invention are shown in FIGS. 2a, 2b, 2c, 2d, 2e, and 2f. In each of these figures, the power of the laser pulse is shown on the vertical or y axis and the temporal duration is shown on the horizontal or x axis.

Among the many other variations of laser pulse configurations which can be used in the practice of this invention are variations in the temporal phasing between the short duration and long duration laser pulses as shown in FIGS. 2a, 2b and 2c.

With reference to FIG. 2a, an initial short duration high peak power pulse 1 is followed by a subsequent laser pulse 2 of longer duration having significantly lower peak power after a relatively much shorter temporal delay 3 than that shown in the schematic of FIG. 1.

FIG. 2b shows the subsequent laser pulse 2 following the initial short duration high peak power pulse 1 with virtually no temporal delay. Alternatively, the long duration laser light pulse envelope of FIG. 2b may be sub-divided into a series of individual shorter duration laser light pulses with adequate time averaged power to promote and sustain fuel ignition.

It is also sometimes useful to start the longer duration low peak power laser pulse 2 before the short duration high peak power pulse 1 when it is desired to reduce the effects of pulse timing jitter. Also, for long duration laser pulses with temporally distributed intensity, insertion before the arrival of the short duration pulse may be required to ensure the presence of sufficiently large pulse intensity to sustain the ionization plasma at the time of its formation. This alternative is shown in FIG. 2c.

Continuous or quasi-continuous alternating sequences of short duration high peak power and longer duration low peak power laser pulses can also be employed in the practice of this invention. This can be done with virtually no temporal delay between the short duration high peak power pulses and the respective subsequent longer duration low peak power pulses as shown in FIG. 2d. Alternatively, there could be varying lengths of temporal delay between the short duration high peak power pulses and the respective subsequent longer duration low peak power pulses, a schematic of which would look like a repeating series of the schematic shown in FIG. 1 or in FIG. 2a.

Short duration high peak power pulses could be continuously alternated with longer duration low peak power pulses as represented in FIG. 2e in which the period of replication equals the length of the combined short duration and long duration laser pulse repeating unit. The laser pulse format shown in FIG. 2e becomes a combination of a series of short duration laser light pulses, each capable of generating a breakdown plasma, with the superposition of continuous light in substitution for the long duration low peak power laser pulses. If the temporal spacing of the short duration pulses represented in FIG. 2e is reduced to a time interval approximating the lifetime of the generated plasma, the cw component can be eliminated altogether, resulting in the pulse format shown in FIG. 2f. This high repetition rate pulse train would be capable of plasma lifetime prolongation and therefore fuel ignition of the kind which is the subject of this invention. This would be useful when using a quasi-continuous source of laser pulses such as a mode-locked laser.

From these examples, it can be seen that a large number of variations of pulse duration and temporal delay can be used in the practice of this invention as long as there is at least one laser pulse that has sufficient peak power to generate a spark (plasma breakdown) and at least one other laser pulse that is of sufficient duration to sustain that plasma breakdown long enough to ensure stable, self-sustaining fuel combustion.

Fuels which can be ignited using the method and apparatus of this invention include, but are not limited to, hydrocarbon fuels such as gaseous fuels or fuels which can be vaporized such as heating oil, kerosene, diesel, or jet fuels.

Figure 3:
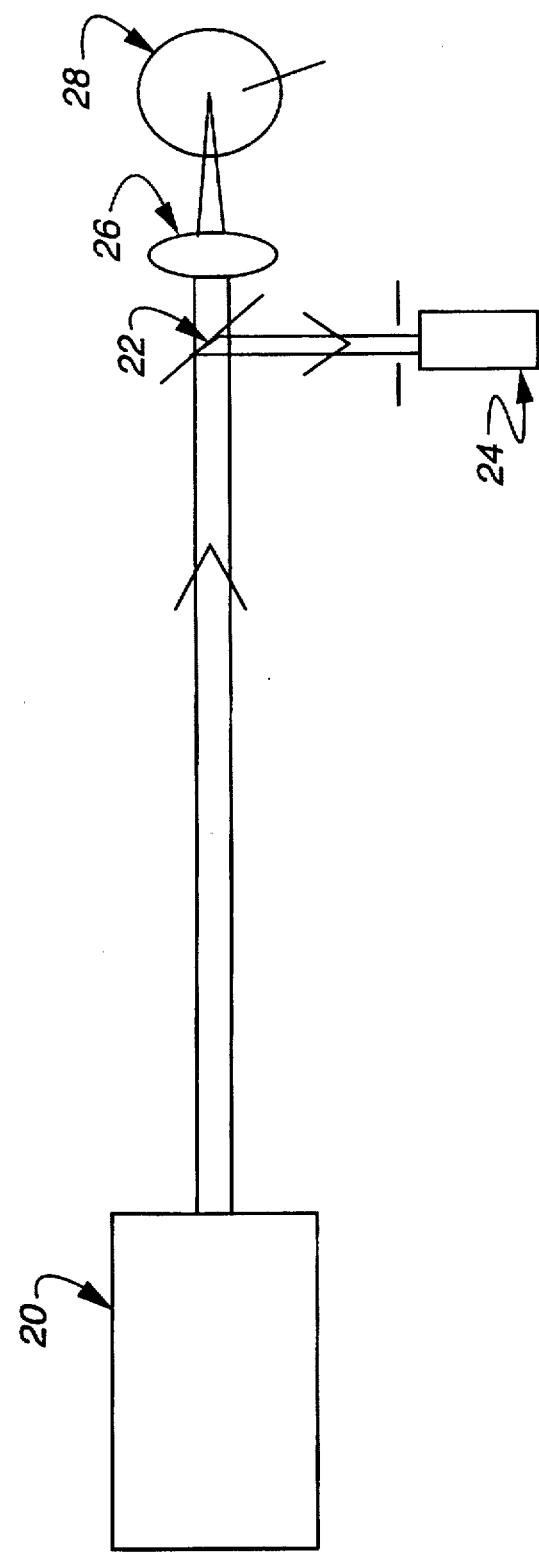
FIG. 3 is a schematic of the setup of the present invention with one laser light source.

Multiple laser pulse ignition in accordance with this invention can be accomplished using an apparatus comprising: at least one laser light source; a beam splitter optic; a photodetector light sensor; and a laser light focusing lens. A setup schematic of a apparatus for the practice of this invention is shown in FIG. 3.

Laser systems useful in this invention must provide a highly specialized output pulse format consisting of at least two sequential pulses (or a single pulse which can approximate the characteristics of the two sequential pulses of this invention) with differing peak powers and temporal pulse widths. No commercial laser is currently available which will provide laser light output with this characteristic. The realization of such a laser is critical to the general utilization of this invention to a wide variety of commercial fuel ignition applications.

A practical configuration for such a laser requires modifications to currently available lasers to satisfy the operating requirements for the practice of the invention. The currently most preferable candidates for modification are Q-switched Nd:YAG lasers which are electro-optically modulated. The laser is modified by incorporating a second pulse forming network to provide the proper driver signal format to the Pockel cell for generating the second low peak power laser pulse with slow rise time by performing a slow Q-switch. The modification is necessary because to obtain the desired dual pulse output, the high voltage driver signal to the Pockel's cell electro-optic modulator must consist of a dual pulse format in order to extract two sequential pulses from the laser.

The first voltage signal to the modulator has a fast rise time of no more than 10 nanoseconds to provide a fast Q-switch and a short duration output laser pulse. After some delay an excited state inversion within the laser crystal is re-established by continued pumping with the excitation flashlamp. A second pulse is then applied to the modulator after a desired delay to induce the extraction of a second laser pulse from the laser. The second pulse will be of longer pulse length if the laser's Pockel's cell is slowly Q-switched. That is, the rise time of the electro-optical driver signal is reduced so that stored laser energy is extracted from the laser crystal over a longer time interval, providing a longer pulse in the laser's output.

With reference to FIG. 3, a single laser source 20 which can alternately produce high peak power/short duration pulses and low peak power/longer duration pulses can be employed in the apparatus. Such a laser light source may produce both short duration and long duration laser pulses by use of sequential fast and slow Q-switch modulation or by a combination of Q-switching, mode-locking, cavity dumping and free lasing modes of operation.

Still with reference to FIG. 3, the single laser source 20 is secured or mounted such that a laser light beam from the laser source is directed through a beam splitter optic 22.

An apertured photodetector light sensor 24 or other photodetector diagnostic instrument is used to accomplish coaxial alignment and correct temporal sequencing of the laser light beam. A portion of the laser source system output is deflected by the beam splitter optic 22 to the photodetector light sensor 24 or other photodetector diagnostic instrument.

As shown in FIG. 3, laser light passing through the beam splitter optic 22 then is focused by a laser light focusing lens 26 which is positioned between the beam splitter optic 22 and the fuel/oxidizer mixture 28 to be ignited. The focusing lens 26 is used to appropriately adjust the power density and focal volume of the laser light within the fuel medium.

Alternatively, more than one laser source could be used in place of a single laser source 20. A first laser is used to provide the high power peak short duration laser pulse. A second laser is used to provide the low peak power long duration laser pulse obtained by performing a slow Q-switch. This may be a commercially available laser with a pulse forming network which provides a driver signal that will give a slow rise time. Otherwise, a commercially available fast Q-switching laser can be modified to incorporate slow Q-switching capability. For example, as shown in the apparatus setup of FIG. 4, two laser light sources 34 and 36 are secured or mounted so as to project laser light beams directly into a beam combiner optic 30 or into a beam combiner optic 30 by way of a laser beam steering system 32.

A beam combiner optic 30 and a laser beam steering system 32 are required to provide coaxial propagation of the combined laser outputs and subsequent spatial overlap in the focal volume of the laser light focusing lens 26. The beam combiner optic 30 and laser beam steering system 32 are mounted or positioned so as to intercept the laser pulses from one or both of the laser light sources 34 and 36 as shown in FIG. 4.

Figure 4:
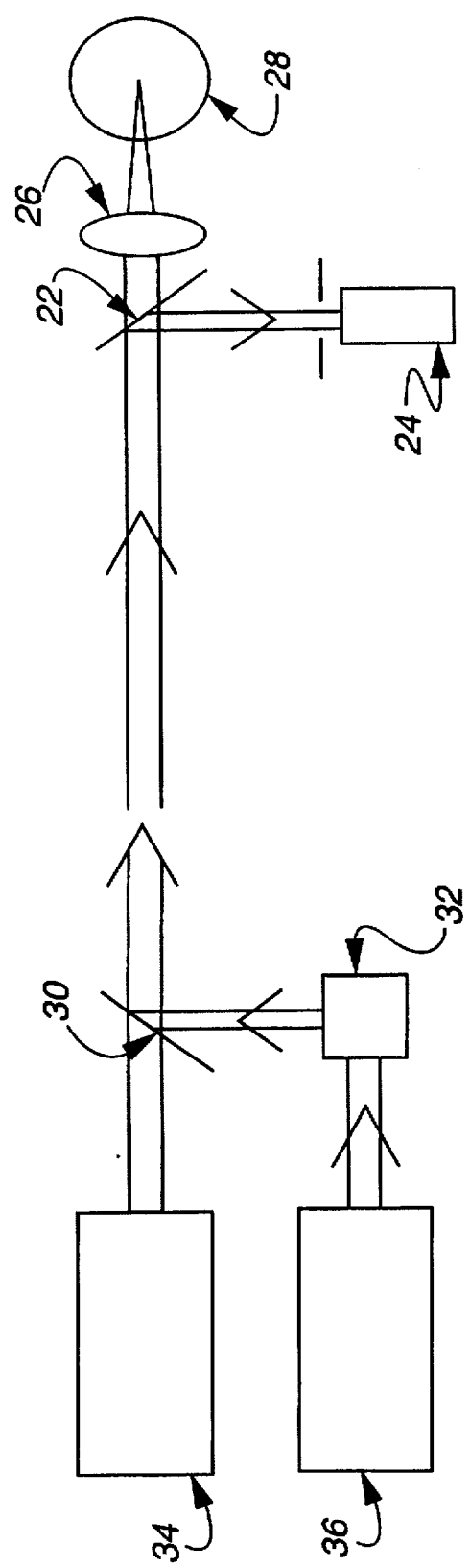
FIG. 4 is a schematic of one setup of the present invention with two laser light sources.

In an example of use of an apparatus having two laser light sources such as that depicted in FIG. 4, short duration high peak power laser light produced by a first laser light source 34 is directed through a beam combiner 30, then through a beam splitter optic 22 to a laser light focusing lens 26. A photodetector 24 is used to monitor the timing of laser pulses diverted by the beam splitter optic 22.

Any of a number of kinds of laser light sources can be employed as the first laser light source 34 to provide the short duration high peak energy pulse as long as the laser light source can function as described above. An example of a useful laser light source would be a fixed wavelength, short pulse duration (<10 ns), Q-switched Nd:YAG laser which can produce high peak power pulses of up to 20 MW.

The output pulse energy of the first laser light source 34 is adjusted to some previously determined value by monitoring the signal amplitude at the output of the photodetector 24. The high peak power pulses output from the Nd:YAG (for example) laser are of sufficient power density at the focal volume to individually initiate plasma formation.

Any of a great number of kinds of laser sources can be used for the second laser light source. An example of a useful second laser light source 36 is a Cr:LISAF laser which can be operated in the short pulse Q-switched mode (<200 ns FWHM) or in the long pulse, free lasing mode (>1 microsec FWHM).

A second laser light source 36 is activated. The output from the second laser light source 36 is directed into the laser beam steering system 32.

Adjustments to the steering system 32 are made until the light signal detected at the photodetector 24 is maximized. This procedure ensures co-axial alignment between the two laser beam paths.

The desired temporal sequencing is achieved by adjusting the temporal delay between the firing of the first laser light source 34 and the firing of the second laser light source 36. Timing is adjusted until the desired wave form is obtained at the output of the photodetector 24.

The fuel/oxidizer mixture to be ignited is introduced into the focal volume of the laser light focusing lens 26.

Optimal ignition performance for the specific fuel/oxidizer mixture being ignited is obtained by: adjusting the pulse energies obtained from the first laser light source 34 and the second laser light source 36; and/or adjusting the temporal delay between the temporal center of the short duration high peak power laser pulse and the longer duration low peak power laser pulse.

More than two lasers may be utilized to derive the desired laser light temporal formats.

For use of the invention apparatus in industrial or commercial applications where the temporal separation of pulses, pulse energies, and pulse widths can be preset, the need for having diagnostic equipment such as the photodetector, beam splitter optic, beam combiner optic, and laser beam steering system can be eliminated; a simple combination of the appropriate laser capable of producing the sequenced pulses and a focusing lens could be adequate. Of course, when more than one laser source is used, most likely a beam combiner would be required.

The following examples will demonstrate the operability of the invention.

EXAMPLE I

An experiment was performed to determine the ability of a long duration low peak power laser pulse to couple laser energy into a previously existing plasma, a critical factor in the implementation of this invention. The ability of the long duration low peak power laser pulse to couple laser energy into a previously existing plasma was evaluated with respect to the measured absorption of the long pulse laser light and its ability to prolong the lifetime of the plasma.

An air breakdown plasma was initially produced by a high peak power laser pulse followed by the application of a longer duration lower peak power laser pulse. The temporal separation between the application of the two laser pulses was varied to evaluate the laser energy coupling efficiency.

Figure 5:
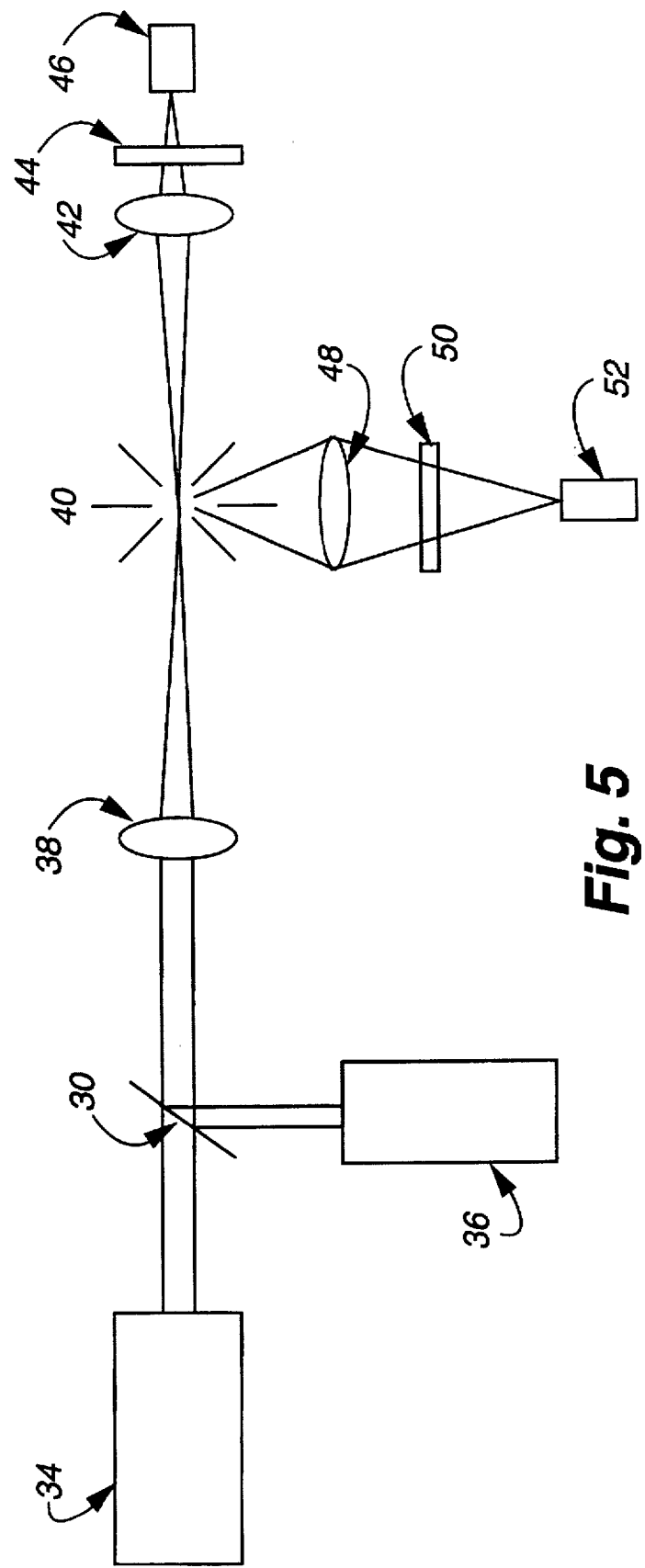
FIG. 5 is a schematic of another setup of the present invention.

The experimental apparatus used in the runs of this example is shown in FIG. 5. A Laser Photonics, Q-switched laser 34 provided the short duration (12 nanosecond FWHM) pulse used to generate an air breakdown plasma. A Cr:LiSAF laser 36 fabricated at Los Alamos National Laboratory was used to provide the long duration (80 nanosecond FWHM) laser pulse. Both lasers operated at the near infrared wavelengths of 1064 nm and 900 nm, respectively.

The peak power of the short pulse length laser light was adjusted to just exceed the light intensity required for air breakdown. The peak power of the long duration pulse laser light used in this example was $1/17$ of that for the short duration pulse laser light and was incapable of inducing air ionization.

The light output of the lasers was spatially overlapped and co-axially propagated using a dielectric beam combiner 30. The laser light from each of the lasers was brought to a common focus using a 5-cm focal length lens 38. The timing delay between the arrival of the short duration and long duration laser pulses at the focal plane was monitored using a Thorlabs[198], fast silicon photodetector 46.

The silicon photodetector 46 was also used to determine the ability of the long duration light to couple energy into the previously established air plasma by monitoring the transmission of long duration laser light through the plasma. Laser light transmitted through the plasma 40 was collected using a 5 cm focal length lens 42 and then focused upon the photodetector 46. A neutral density filter 44 was used to adjust laser light intensity upon the photodetector 46. To monitor the emission of white light (blackbody emission) from the plasma as a function of time, a 10-cm focal length light collection lens 48 and a silicon photodetector 52 were used. Light emanating from the plasma 40 was collected and focused upon the photodetector 52. A filter 50 was used between the lens 48 and detector 52 to remove scattered laser light from the plasma emission.

Figure 6:
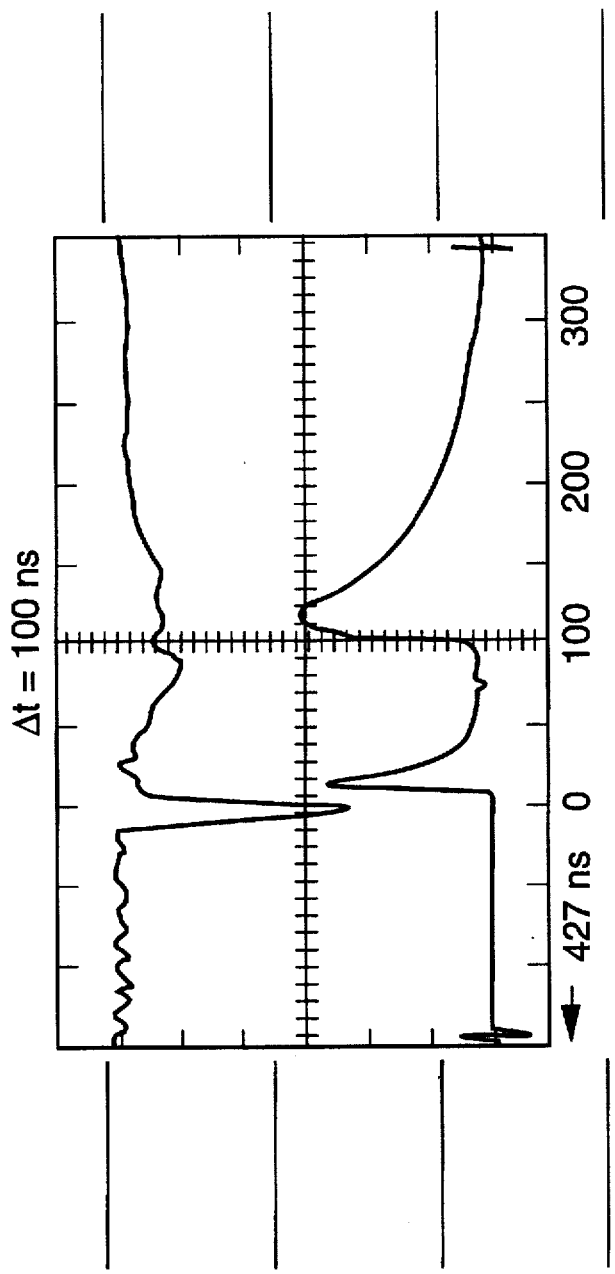
FIG. 6 is an oscilloscope trace recording of typical results of practice of the invention.

A typical result of this experiment is shown in FIG. 6 which consists of an oscilloscope trace recording on the same time scale as the laser light intensity transmitted through the plasma as monitored by the photodetector in the upper curve (inverted signal) and the intensity of light emission from the plasma detected by a photodiode in the lower curve. The temporal separation between the short duration and long duration laser pulses was 100 nanoseconds for this example. The Nd:YAG pulse appears on the left in the upper curve and Cr:LiSAF pulse appears on the right.

The lower curve defining the plasma light emission shows a sudden intense emission of white light as the Nd:YAG pulse induced ionization of the air. At the end of the Nd:YAG pulse, the plasma emission is observed to have decayed rapidly with a decay constant of about 40 nanoseconds. Upon arrival of the long duration Cr:LiSAF laser pulse, the plasma emission ceased to decay and then began to increase in emitted light intensity. The local minimum in this curve, when compared to the corresponding laser power applied to the plasma at the same time, defines the laser power required to indefinitely sustain the plasma. The white light emission then reached a maximum at a time corresponding to the maximum intensity of the Cr:LiSAF pulse and at later times began to decay again. The time interval over which the plasma existed and thus the interval in which the surrounding air was actively heated by the absorption of laser energy was about 350 nanoseconds.

The upper curve of the oscilloscope trace shows a substantial modification to the intensity profile of the Cr:LiSAF laser pulse due to the absorption of the laser light in transit through the air plasma. Analysis of this information shows that about 70% of the long duration pulse laser light was absorbed by the plasma.

Several important conclusions can be drawn from the measurements.

First, laser light energy contained in the low peak power laser pulse was efficiently delivered to the plasma as demonstrated by the 70% light absorption.

Second, the measured laser power required to sustain the air-borne plasma indefinitely was determined to be about 70 KW.

Third, by applying the proper temporal delay between the laser pulses which create the breakdown plasma and the laser pulse which sustains it, the high temperature light absorptive plasma could be maintained over time intervals as long as 350 nanoseconds, exceeding the lifetime of the unpumped plasma by nearly a factor of 10. This is of exceptional importance to the application of the multiple laser pulse method to fuel ignition.

Figure 7:
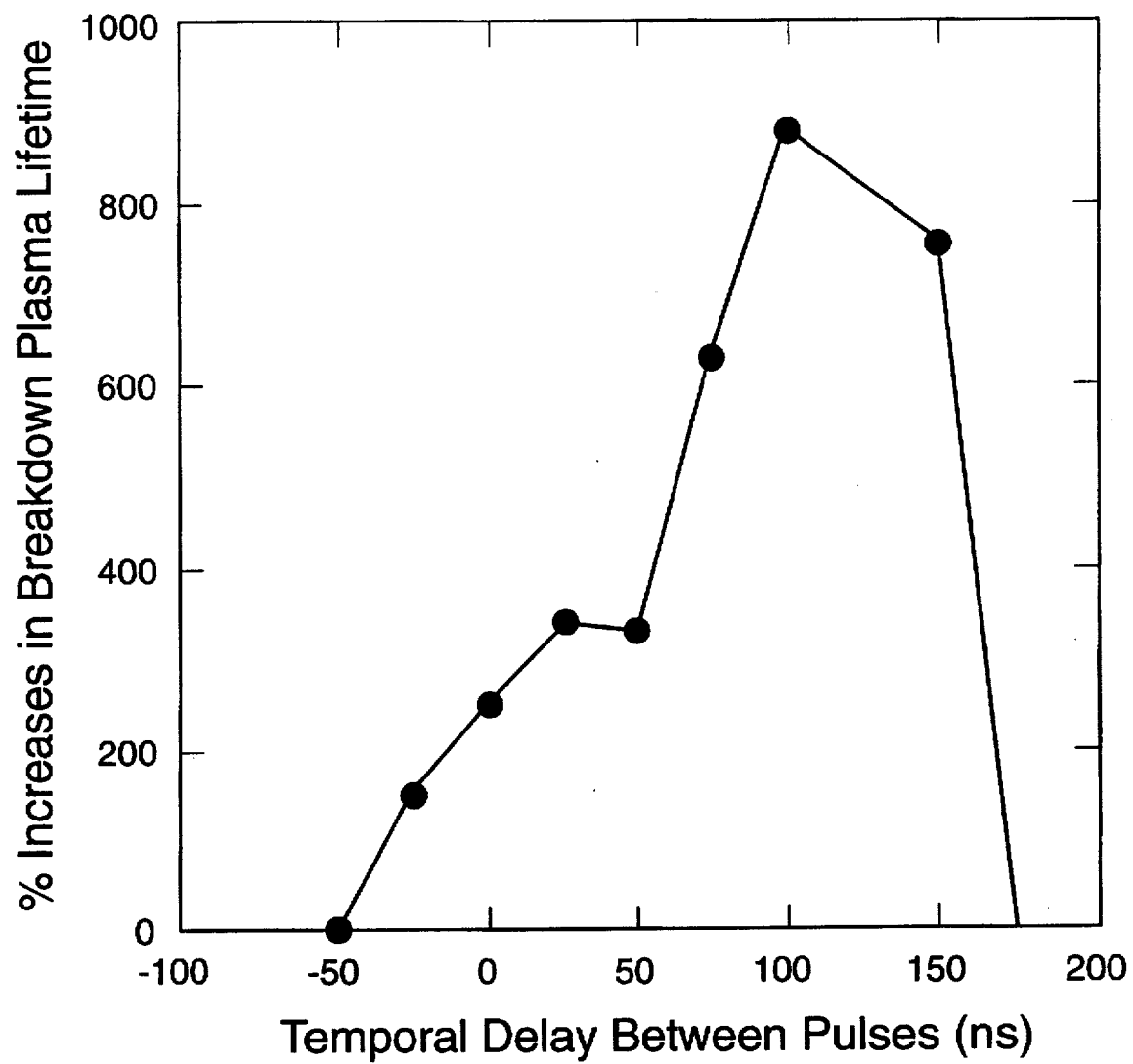
FIG. 7 is a graph of results of varying temporal delay between high peak power and low peak power pulses.

To determine the maximum duration over which the air breakdown plasma could be maintained, the temporal delay between the high peak power air breakdown pulse and the lower peak power longer duration sustaining pulse was varied over a range from zero to 175 nanoseconds. The result is shown in FIG. 7, where a plasma lifetime maximum was achieved for a temporal delay of 100 nanoseconds. This value for pulse separation was used in the initial application of this method to fuel ignition. Similar measurements to that described in FIG. 11 were made during the fuel ignition studies of Example III relating ignition probability to the relative delay between these pulses.

EXAMPLE II

This example provides a demonstration of the operability of the invention method and apparatus and provides data for comparison of the performance of this invention relative to that of state-of-the-art single laser pulse methods.

Figure 8:
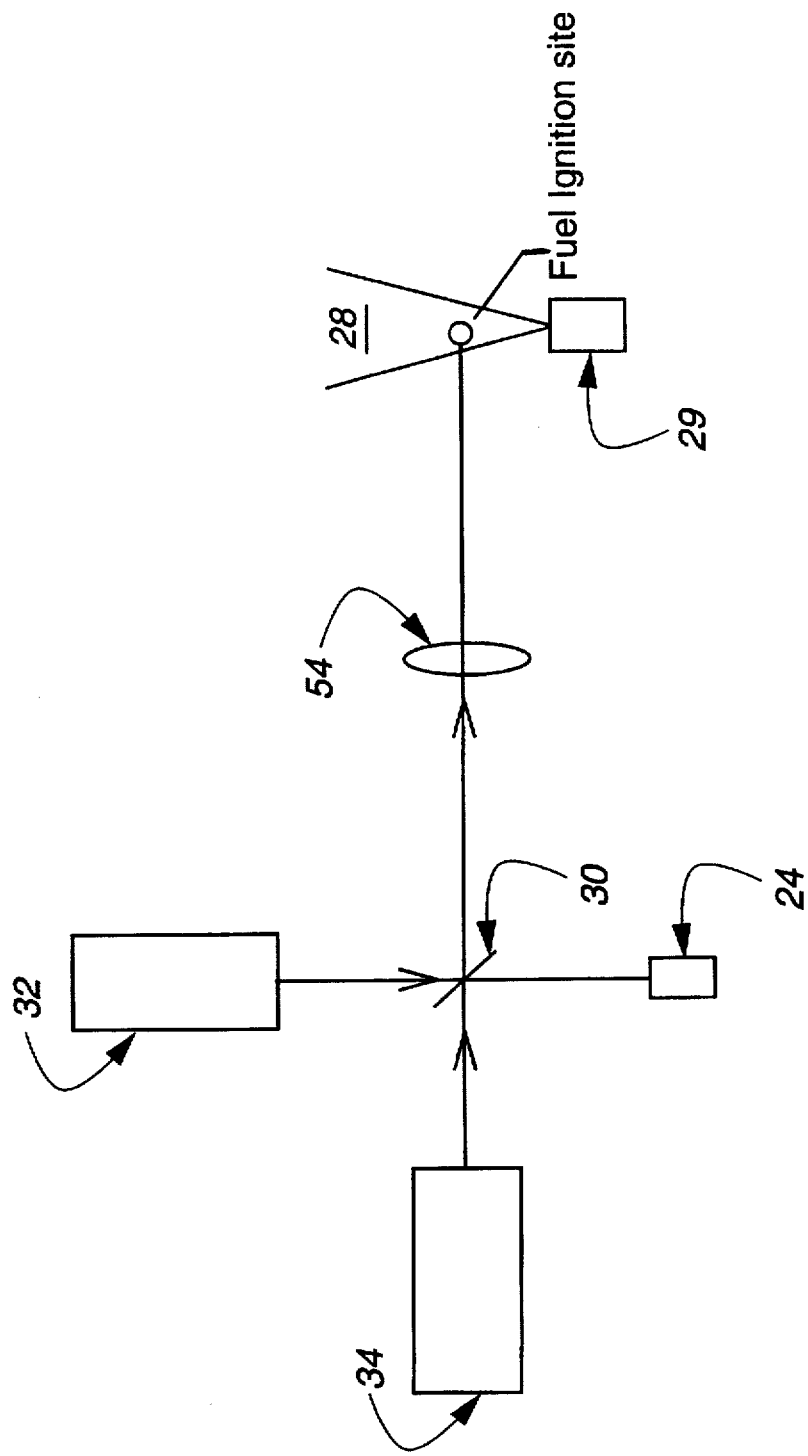
FIG. 8 is a schematic of yet another setup of the present invention.

An aerosol of Jet A fuel, produced by a forced-air fuel atomizer of a type used in commercial turbo-jet aircraft was used as the combustible medium in the tests of this example. For this demonstration, the multiple laser pulse ignition system was configured as two separate lasers as shown in FIG. 8. A Laser Photonics™ Q-switched Nd:YAG laser was used to provide short duration laser light with a pulse width of 12 nanoseconds FWHM and a Cr:LiSAF laser constructed at Los Alamos National Laboratory provided a longer duration laser light with a pulse length of 100 nanoseconds FWHM. Both lasers operated at an infrared wavelength (1064 nm and 900 nm, respectively).

The coaxially propagated light output of the lasers 32 and 34 was focused into the jet fuel aerosol using a 10 cm focal length lens 54. The Nd:YAG laser was operated at the peak power threshold for breakdown within the fuel medium at the focal volume of the lens 54 while the long pulse length laser was operated at a peak power of less than 1/17 of the short pulse peak power. The arrival of the long duration laser light to the fuel medium was delayed 100 nanoseconds relative to the output of the short duration pulse laser. This delay extended the lifetime of the high temperature plasma by a factor of 10.

Figure 9:
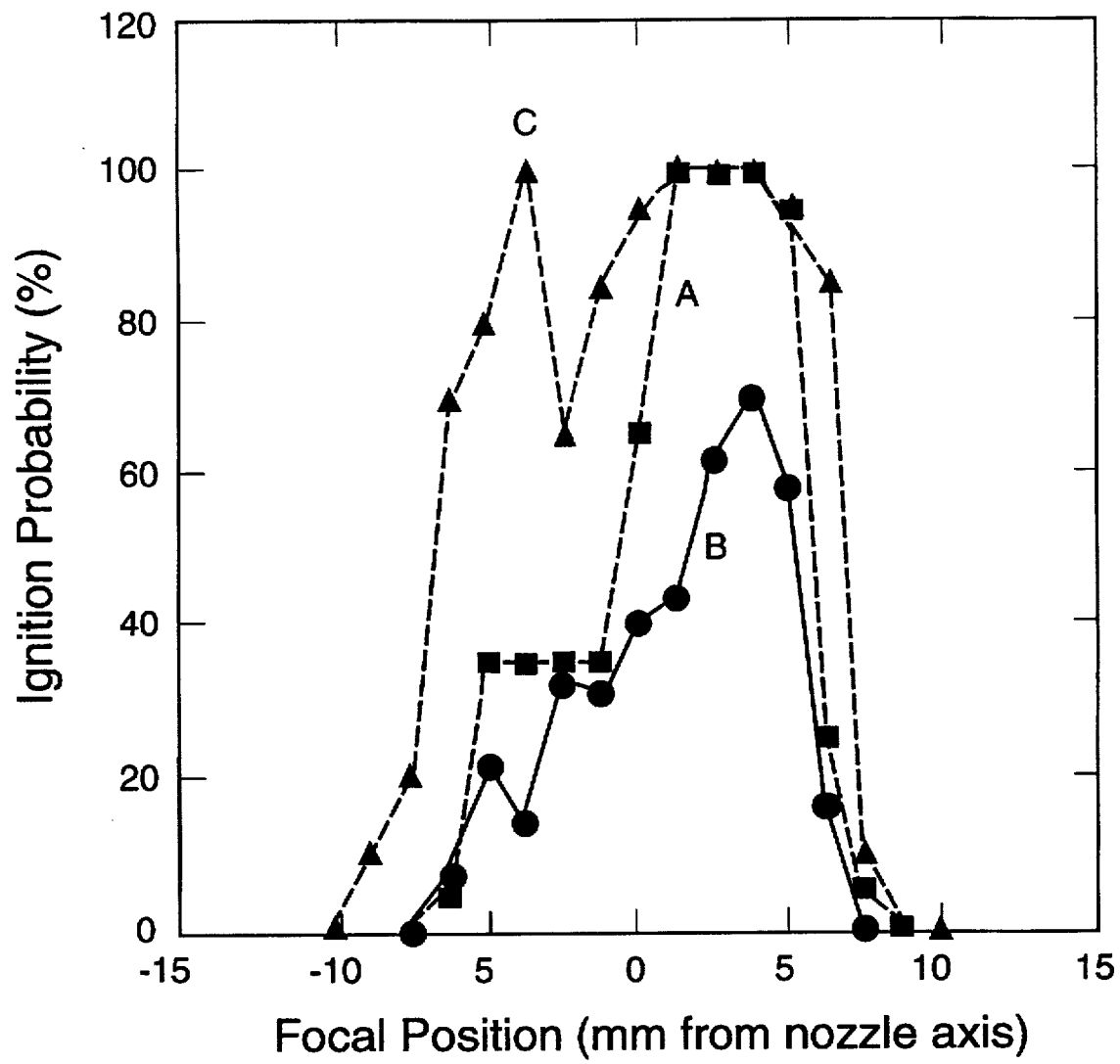
FIG. 9 is a graph of a comparison of ignition probability using the invention with ignition probability using a single pulse ignition method.

The results of the test runs of this example, comparing the ignition performance of the sequential multiple laser pulse concept with the ignition performance of a state-of-the-art single laser pulse fuel ignition method is shown in FIG. 9. Fuel ignition probability at various radial sites within the fuel aerosol cloud at which laser light is focused was defined for the multiple laser concept (curve A) and for the single laser pulse method (curve B).

Total laser energy applied to the fuel aerosol was identical for each of the two ignition methods tested (140 mJ). For curve B, all 140 mJ of laser energy was applied to the fuel in a time interval of 12 nanoseconds (the temporal pulse width of the Nd:YAG laser), a peak laser power of 12 MW. With respect to curve A, only 75 mJ of the total laser energy was delivered in this time interval (nearly a factor of two reduction in Nd:YAG peak output power). The lower laser energy required for breakdown plasma formation in the fuel aerosol (75 mJ) compared to that in air (about 90 mJ) using the same focusing lens is due to the focusing action of individual fuel droplets which form a trail of microplasmas along the laser beam path. The balance of laser energy is distributed over the duration of the long duration pulse width laser pulse (100 nanoseconds), a peak power of only 700 kW.

The large difference between the two ignition probability profiles clearly demonstrates the advantage of reducing the rate and increasing the duration in which laser energy is delivered to the fuel, as provided by the novel laser-based ignition concept of the present invention.

Several important conclusions can be drawn from this comparison. The data from this example demonstrate that 100% reliable ignition can be achieved for the multiple pulse laser ignition method and apparatus of this invention. This is compared to a lower 70% probability of ignition for the conventional laser-based method using the same total laser energy. This demonstrates that the available laser energy is used more efficiently in the promotion of fuel combustion with this invention. The reduced rate of laser energy delivery to the fuel medium inhibits the formation of intense shock waves which can extinguish fuel combustion.

The extensive region (several millimeters in length) within the fuel cloud in which consistent ignition is obtained by use of the invention indicates reduced sensitivity to local variations in fuel composition and/or less sensitivity to energy loss by laser light scattering from fuel droplets.

If the energy of the long duration laser pulse is increased further by 30 mJ, curve C of FIG. 9 demonstrates that 100% ignition is also achieved at the side of the fuel cloud opposite the laser source. In this instance, 80% or greater ignition probability was achieved over nearly the entire 20 mm width of the fuel aerosol cloud.

Figure 10:
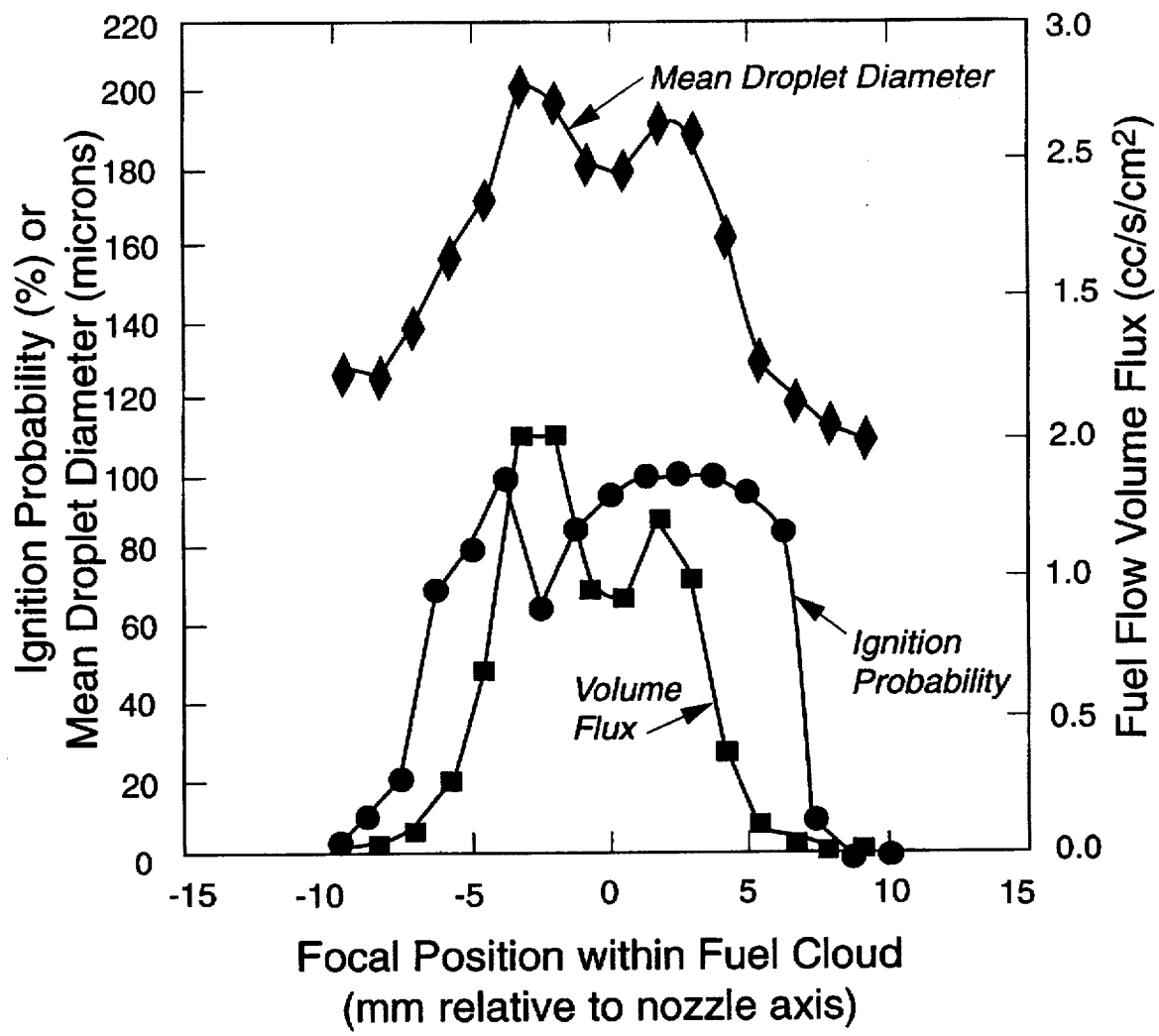
FIG. 10 is a graph of results of varying focal position within fuel cloud, mean droplet diameter and fuel flow volume flux.

FIG. 10 demonstrates the ability of the multiple pulse laser ignition method and apparatus of this invention to initiate jet fuel aerosol combustion over a wide range of fuel compositions, where the ignition probability profile of Curve C in FIG. 9 is plotted on the same graph with the corresponding distributions of fuel volume flux (cc/s/cm$^2$) and droplet size (Sauter Mean Diameter in microns) present at the laser initiation sites. The fuel composition values were provided by PDPA measurement. Consistent, 100% reliable ignition was demonstrated over a factor of 3 variation in fuel composition and for aerosol conditions dominated by large droplet sizes ranging from 160 to 190 micron in mean diameter.

EXAMPLE III

This example demonstrates the laser energy coupling efficiency of the invention. An important advantage of this invention over the state-of-the-art single laser pulse ignition method is the fact that this invention provides the ability to control both the rate and duration of laser energy delivery to the fuel/oxidizer medium. The energy transfer mechanism permitting the delivery of laser energy to the fuel is the laser induced heating of the light absorptive plasma created by a laser spark breakdown process.

Measurements of the laser energy coupling efficiency to a previously established plasma were described in Example I, where it was shown that the hot air-borne plasma could be sustained over time intervals as long as 350 nanoseconds by applying the appropriately long pulse duration (80 nanoseconds) and the proper temporal sequencing (100 nanoseconds) between plasma inducing and plasma sustaining laser pulses, as shown in FIG. 7. As the temporal delay is increased beyond 100 nanoseconds, the energy coupling efficiency between laser light and the plasma decreases (less white light emission from plasma). At a pulse separation of 175 nanoseconds, no energy transfer was observed.

A similar set of runs were performed to define the dependence of fuel ignition performance upon the temporal delay between short duration and long duration fuel ignitor laser pulses using the apparatus shown in FIG. 8. The results of the runs of this example are given in FIG. 11, where jet fuel aerosol ignition probability is plotted vs temporal delay between the application of laser pulses to the fuel medium. Focal positions were 3.75 mm from nozzle axis and 1.0 cm from the nozzle. Fuel pressure was 25 psia and air flow was 1.0 in H$_2$O. Pulse width of the Nd:YAG laser was 14 ns and pulse width of the LiSAF laser was 84 ns. Nd:YAG energy was 74 mJ; LiSAF energy was 100 mJ. Ignition probability was maximized for temporal delays in the range of 1 to 150 nanoseconds. At larger delays, the observed ignition probability was reduced.

Figure 11:
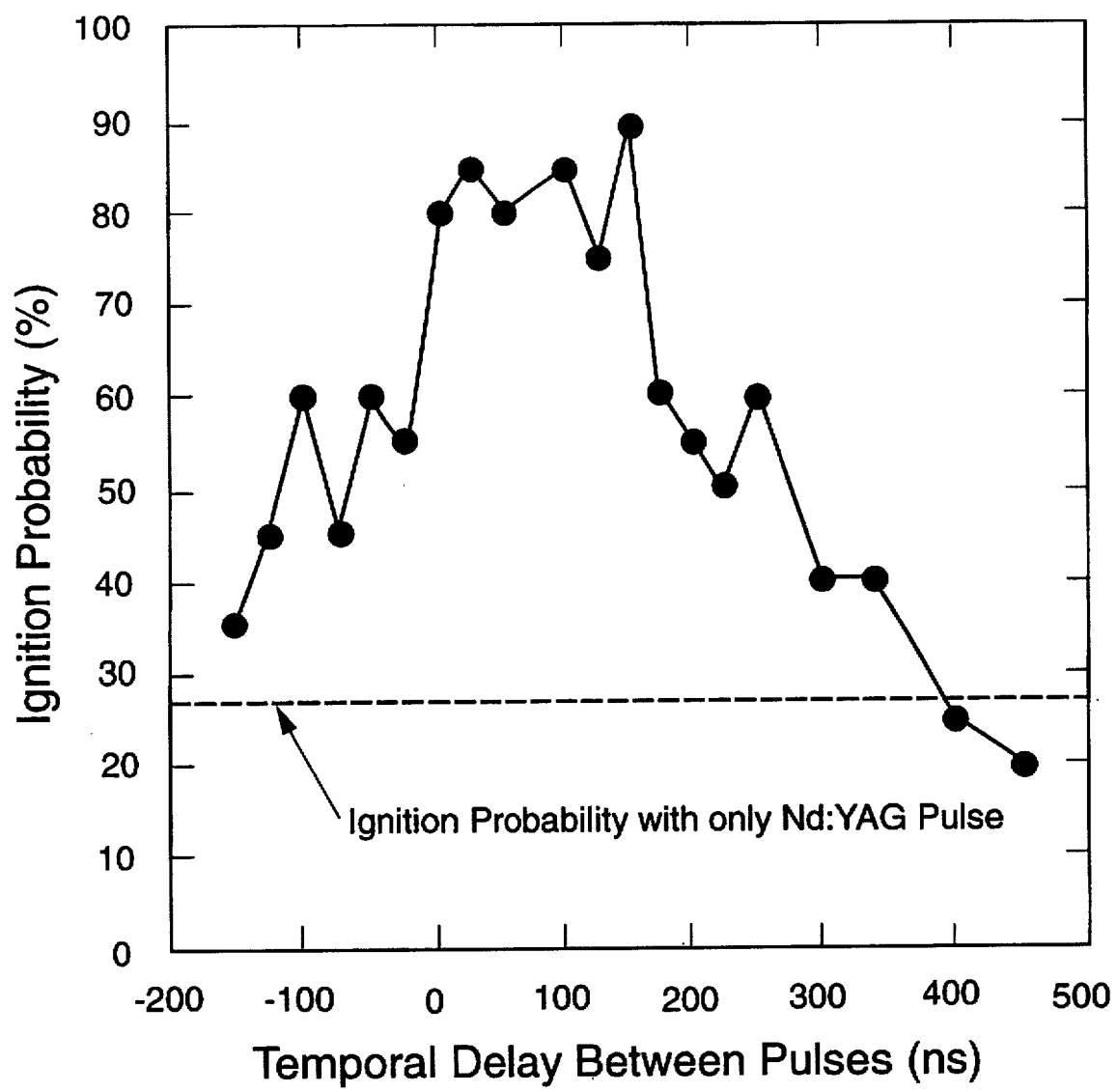
FIG. 11 is a graph of effect of temporal delay between pulses on ignition probability.

From FIG. 11, at pulse delays greater than 150 nanoseconds, one would expect the ignition probability to fall to that obtained by application of the short duration laser pulse alone (dashed line in plot), since no laser energy coupling to the breakdown plasma is expected. What was observed was a sharp decrease in ignition probability at a delay of 150 nanoseconds, followed by a steady decrease in ignition performance at delays between pulses as large as 350 nanoseconds.

This indicated that laser energy was being coupled to the fuel via some mechanism other than the direct pumping of the initial spark breakdown plasma. It is proposed that the enhancement in ignition performance over that predicted for large temporal pulse separations was due to the combined effects of laser light coupling to ionized molecular species produced by fuel combustion directly and/or the laser induced ionization of thermally and photonically excited fuel/oxidizer molecules participating in an electron cascade interaction or absorption process with the laser light.

This coupling mechanism is of considerable importance to the performance of the fuel ignition invention of this application since it provides another means of transferring laser energy to the fuel over longer time intervals than available by direct coupling to the breakdown plasma. This process could be very useful to a flame stabilization process in which laser energy is transferred to burning fuel over very long time intervals (microsecs to millisecs in duration). In such a use of the invention, the first laser pulse would initiate combustion while the second pulse sustains or supplements fuel combustion.

Figure 12:
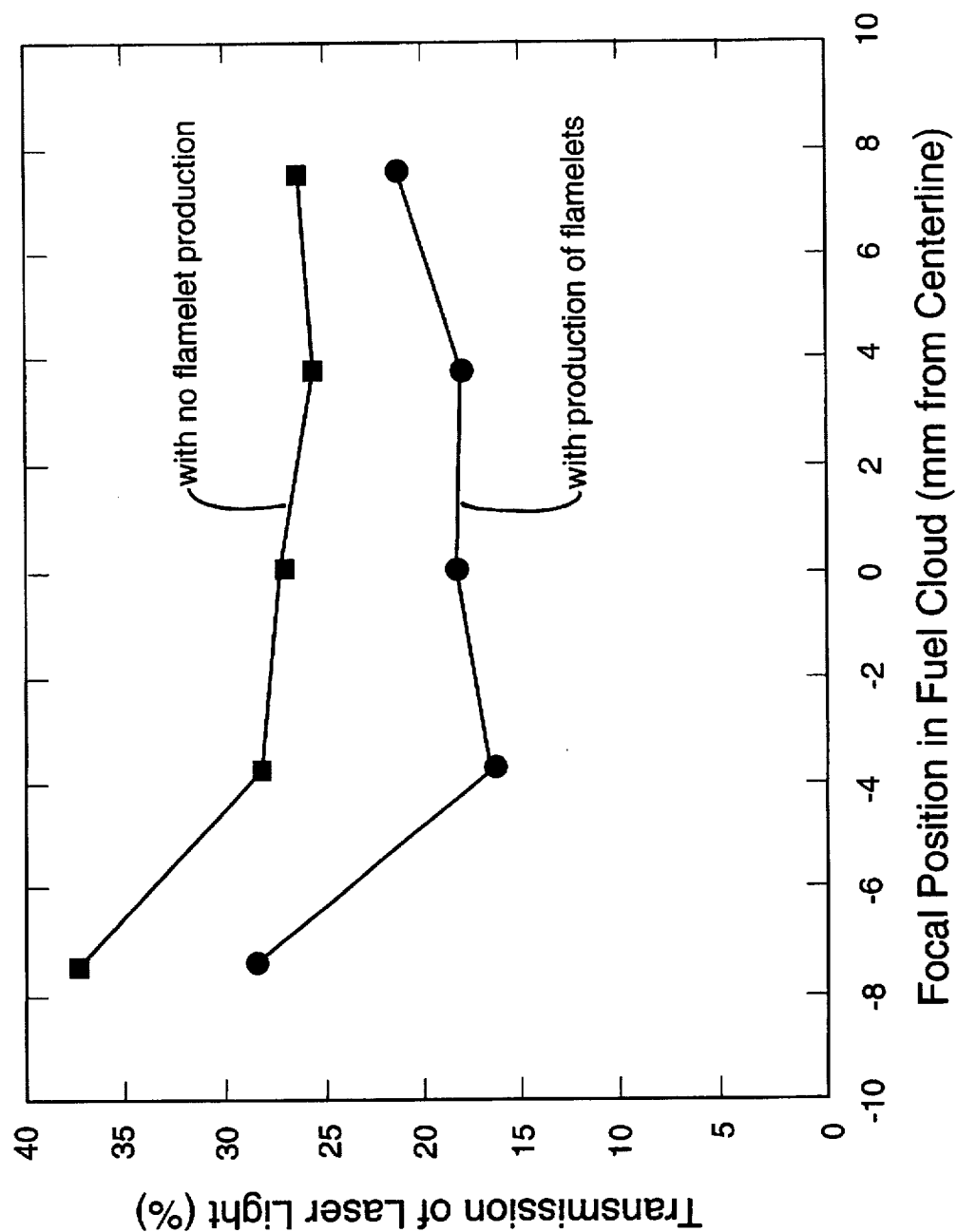
FIG. 12 is a graph of amounts of laser light transmitted related to focal position in a fuel cloud.

Further evidence of this combustion related laser energy coupling mechanism is shown in FIG. 12 where the transmission of high peak power laser light, used to initiate fuel aerosol ignition, was measured in passage through the fuel aerosol cloud for two different circumstances: (1) when fuel ignition was achieved; and (2) when no fuel ignition resulted. The apparatus used for this example was the same as that shown in FIG. 5, with the photodetector 46 replaced by a laser pulse energy monitor.

The plot of FIG. 12 shows the two transmission curves obtained as a function of focal position within the fuel cloud. In all cases, the transmission of laser light through the ignited fuel aerosol was smaller by typically 15% than when no fuel ignition occurred. This provides further evidence for the existence and utilization of combustion related laser energy transport mechanisms.

EXAMPLE IV

Additional tests of the invention were made to demonstrate the efficacy of the invention under varying fuel temperature conditions. The apparatus shown in FIG. 8 was used in ignition of Jet A fuel aerosols. The temperature of fuel flowing to the spray atomizer nozzle was varied over a range from 35° F. to 105° F. Air temperature was kept constant at 85° F.

The pulse energy of the short duration laser pulse (12 ns FWHM) used to initiate a breakdown plasma within the fuel aerosol was kept contant (100 mJ) while the energy of the long duration laser pulse (70 ns FWHM) was varied as required to provide 100% consistent ignition of the fuel aerosol cloud. The time interval (50 ns) between the application of the short duration and the long duration pulses to the fuel, as well as the region within the fuel cloud in which these laser pulses were focused were also kept constant.

The results of these tests demonstrate that Jet A fuel aerosols can be consistently ignited at fuel temperatures as low as 35° F. using the invention method and apparatus. Results of tests made in this example are shown in FIG. 13.

Figure 13:
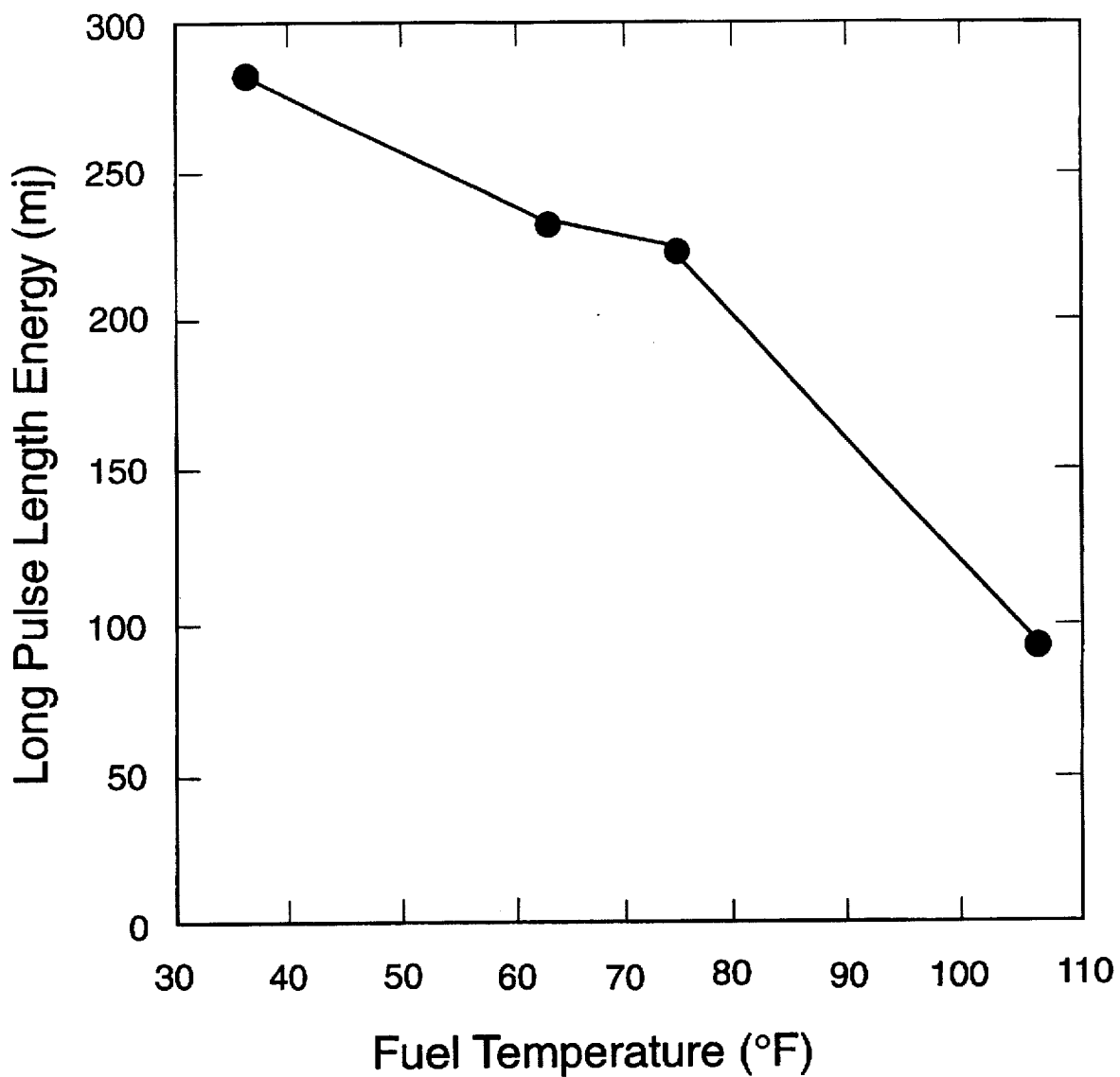
FIG. 13 is a graph of required laser energy versus fuel temperature.

As shown in FIG. 13, a factor of three variation in long duration laser pulse energy was required to attain consistent fuel ignition over this remperature range.

Since the fuel composition with respect to distributions of fuel droplet size, number density and velocity at any given point within the aerosol cloud will also vary with temperature. The ignition performance is also influenced by the temperature dependent changes in fuel composition.

The results of these tests are valid with respect to the application of the invention to turbojet aircraft engine ignition, for instance, where similar fuel composition variations with respect to fuel temperature can be expected. These tests have shown that a significant reduction in long duration pulse energy required to ignite cold fuel can be obtained by increasing the temporal delay between short and long duration pulses.

As demonstrated in the foregoing examples, the method and apparatus of this invention provide a reliable ignition process. The temporally tailored laser light of this invention improves ignition of gaseous or aerosol fuel/oxidizer mixtures by providing laser energy delivery at controlled rates and duration.

Energy efficiency is achieved in the laser ignition of gaseous or aerosol fuel/oxidizer mixtures. More efficient ignition of gaseous or aerosol fuels enables lean burning, reduces fuel consumption and pollutants and reduces expenses. Laser light peak power energy requirements for ignition are reduced by this invention, resulting in energy efficiency and reduction in size of lasers needed.

Since laser plasma formation and ignition kernel generation and propagation processes are largely de-coupled in the practice of this invention, laser operating formats can be precisely tailored to provide improved ignition performance over a wide range of fuel parameters. De-coupling of plasma generation and flame kernel formation permits the more gradual build-up of the flame kernel rather than the heretofore-known explosive delivery of laser energy, thus avoiding the generation of self-extinguishing shock waves.

Ignition reliability accomplished by using lasers (fewer moving engine parts) translates into improved engine reliability. Use of the invention eliminates ignitor wear and high-voltage breakdown, two factors that contribute, in airline applications, to inflight shutdowns, delays and cancellations, and unscheduled removals of ignition components.

Economic and other advantages are possible because smaller laser pulse sources can be used for ignition with the present invention. All-solid-state lasers are rugged, can be compactly packaged, and are diode pumpable.

While the apparatuses and methods of this invention have been described in detail for the purpose of illustration, the inventive apparatuses and methods are not to be construed as limited thereby. This patent is intended to cover all changes and modifications within the spirit and scope thereof.

INDUSTRIAL APPLICABILITY

The methods and apparatuses of this invention can be used for reliable ignition of hydrocarbon fuels such as gaseous fuels or fuels which can be vaporized such as heating oil, kerosene, diesel, or jet fuels. Aircraft gas turbine engines, ground-based electrical power generation engines, gas turbine and reciprocating (piston) engines used to pump oil and gas, and even ground transportation engines could all benefit from use of the ignition method of this invention.

In addition to the laser induced ignition of gaseous and aerosol fuels, this invention can be used for the precise excitation and detonation of explosive or energetic materials.

The novel solid-state sequential pulse laser of this invention can be used for other applications such as tissue and gauze cutting in the medical industry and laser-cutting and machining of a variety of materials.

What is claimed is:

1. An ignition apparatus comprising:
    (a) a first laser light source having therein a means for generating a high peak power Q switched laser pulse;
    (b) a second laser light source having therein a means for generating a low peak power Q switched laser pulse; and
    (c) a lens through which said high peak power Q switched laser pulse and said low peak power Q switched laser pulse can be focused on a fuel to be ignited;

wherein said means for generating a high peak power short duration Q switched laser pulse and said means for generating a low peak power long duration Q switched laser pulse can operate sequentially.

2. An ignition apparatus as recited in claim 1 wherein said apparatus further comprises:

(d) a laser beam combiner positioned between said first and said second laser light source.

3. An ignition apparatus as recited in claim 1 wherein said apparatus further comprises:

(f) a beam splitting optic positioned between said laser and said lens; and (g) a photodetector sensor positioned to receive a portion of said high peak power Q switched laser pulse and said low peak power Q switched laser pulse directed away from said lens.

4. An ignition apparatus comprising:

(a) a laser light source having therein a means for generating a high peak power laser pulse and a means for generating a low peak power laser pulse;

(b) a lens through which said high peak power laser pulse and said low peak power laser pulse can be focused on a fuel to be ignited;

(c) a beam splitting optic positioned between said laser and said lens; and (d) a photodetector sensor positioned to receive a portion of said high peak power laser pulse and said low peak power laser pulse directed away from said lens;

wherein said means for generating a high peak power short duration laser pulse and said means for generating a low peak power long duration laser pulse can operate sequentially.

* * * * *